(12) United States Patent
Yamazaki

(10) Patent No.: US 7,064,777 B2
(45) Date of Patent: Jun. 20, 2006

(54) BLUR CORRECTION APARATUS, CONTROL APPARATUS TO BE USED IN A BLUR CORRECTION APPARATUS, IMAGE TAKING APPARATUS, CONTROL METHOD TO BE USED IN THESE APPARATUSES AND COMPUTER PROGRAM PRODUCT TO BE USED WITH THESE APPARATUSES

(75) Inventor: Tatsuya Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 09/941,591

(22) Filed: Aug. 30, 2001

(65) Prior Publication Data

US 2002/0027599 A1    Mar. 7, 2002

(30) Foreign Application Priority Data

Aug. 31, 2000  (JP) .............................. 2000-262933

(51) Int. Cl.
*H04N 5/228* (2006.01)
(52) U.S. Cl. ...................................... 348/208.5; 396/55
(58) Field of Classification Search ........... 348/208.99, 348/208.1, 208.4, 208.6
See application file for complete search history.

(56) References Cited

U.S. PATENT DOCUMENTS 5,053,875 A * 10/1991 Ishii et al. ............. 348/208.99
5,617,176 A *  4/1997 Matsuzawa et al. .......... 396/55
5,959,666 A    9/1999 Naganuma ............... 348/208.3

FOREIGN PATENT DOCUMENTS

JP    08-331429    12/1996
JP    08-331440    12/1996

OTHER PUBLICATIONS

Translation of JP-A 8-331440.

* cited by examiner

*Primary Examiner*—David Ometz
*Assistant Examiner*—Yogesh Aggarwal
(74) *Attorney, Agent, or Firm*—Fitzpatrick, Cella, Harper & Scinto

(57) ABSTRACT

Apparatuses are provided such as a blur correction apparatus for limiting operation of a blur correction in accordance with the size of a vibration detected by a vibration detection means, a time period for the taking of an image and the frequency of the vibration; a control apparatus to be applied in the blur correction apparatus; and an image taking apparatus; and a control method to be applied to these apparatuses, and a computer program product for use in these apparatuses.

16 Claims, 11 Drawing Sheets

| SHUTTER SPEED | PREDETERMINED VALUE A | PREDETERMINED VALUE B |
|---|---|---|
| 1/60 | 40 | 60 |
| 1/90 | 60 | 80 |
| 1/120 | 80 | 90 |
| 1/180 | 90 | 95 |
| 1/250 | 100 | 100 |
| 1/500 | 100 | 100 |
| 1/1000 | 100 | 100 |
| 1/2000 | 100 | 100 |

BLUR CORRECTION APARATUS, CONTROL APPARATUS TO BE USED IN A BLUR CORRECTION APPARATUS, IMAGE TAKING APPARATUS, CONTROL METHOD TO BE USED IN THESE APPARATUSES AND COMPUTER PROGRAM PRODUCT TO BE USED WITH THESE APPARATUSES

BACKGROUND OF THE INVENTION

1. Field of the Invention

The present invention pertains to a blur correction apparatus for correcting an image blur, a control apparatus to be used in a blur correction apparatus, an image taking apparatus such as a camera, for example, capable of taking still images and/or moving images and having an image blur correction function, a control method to be used in these apparatuses, and a computer program product to be used with these apparatuses.

2. Related Background Art

Currently, in video cameras and the like having a blur correction function there is included at least a vibration detection means for detecting vibrating components, and a blur correction means for correcting an image blur in accordance with results of detection performed by the detection means.

Examples of the vibration detection means include directly detecting the vibrating components of the instrument by means of an angular velocity sensor, an angular acceleration sensor, etc., or an electronic method of detecting movement of the image by comparing the image across continuous fields or frames.

Examples of the blur correction means include optical types for mechanically correcting the optical axis, and electronic types for performing the correction by electronically selecting the range that is to be actually recorded or outputted (i.e., the cut out range) from the image that has been obtained.

In an electronic blur correction means there are such methods as, for example, saving in a memory an image that has been taken and then cutting out and enlarging a part thereof, or another method of using an image taking element which has a greater number of pixels than those of the standard image taking element required in the broadcasting format, and then cutting out a size therefrom which is equivalent to the standard size of the broadcasting format.

In consideration of blur prevention performance, the optical type in which the correction is continuously being made is more advantageous than the electronic type in which corrections are made per field; however, the optical type requires separate mechanical parts to perform the corrections, while the electronic type performs the corrections by means of a CDD or memory, so it is more advantageous for purposes of compact construction. Therefore, with video cameras and the like, in the case when priority is given to the compact construction, the blur correction is generally performed by means of the electronic type.

Thus, explanation will be made here regarding the electronic type of correction, and in particular, the method of using the image taking element which has a greater number of pixels than those of the standard image taking element required in the broadcasting format and then cutting out therefrom a size equivalent to that of the standard size of the broadcasting format.

FIG. 11 is a diagram depicting an image taking area of this image taking element. Reference numeral 501 is the entire image taking area of the image taking element, and reference numerals 502, 503 and 504 indicate the broadcasting format standard size. In the case when the blur correction is not performed, the area designated by 503, which is the center, is cut out and outputted as an image.

In the case when the blur correction is to be performed the cut out area is moved over to 502 or 504, for example, in response to a signal from the vibration detection means in order to remove the image blur, and then the image is outputted. The cut out position can be anywhere as long as it is within the entire image taking area 501.

FIG. 12 is a constructional diagram of a blur correction unit of a video camera or other image taking apparatus having a blur correction device in which the detection means is an angular velocity sensor and the blur correction means is of the electronic method. Hereinafter, explanation will be made following FIG. 1 regarding an image taking apparatus having the blur correction device.

Reference numeral 101 is a lens unit and reference numeral 102 is a solid image taking element (CCD). The subject image is imaged on the CCD 102 by means of the lens unit 101 and then an photoelectric conversion takes place with the CCD 102. Used as the CCD 102 here is a CCD having a greater number of pixels than in the standard CCD required in the broadcasting format (such as, for example, NTSC format). Reference numeral 104 is a CCD driving circuit and drives the CCD 102. The CCD driving circuit 104 obeys control instructions from the microcomputer 130 described below, so that it can make a selection in a V direction as to from which line the output area is ultimately to be cut out. Reference numeral 501 in FIG. 11 is the entire image size, and 502, 503 and 504 are examples of standard image sizes in accordance with broadcasting formats. If, for example, the area from line ya+1 that is Δya line below from the topmost line is considered to be valid then the line Δya is read out at high speed, and thus it is performed to read out from ya+1 at the same timing as in the case where a standard size CCD is used with respect to the vertical synchronization signal. Then, by reading out the remaining line Δyb at high speed, it is possible to cut out a standard-sized line in the V direction.

Reference numeral 103 is analog signal processing portion, and this performs predetermine processing on the signal obtained at the CDD 102 and generates an analog image taking signal. Reference numeral 103 may be a CDS circuit (i.e., a co-related double sampling circuit), an AGE circuit, etc. Reference numeral 106 is a memory, and this memory 106 is capable of storing at least the amount of one line of a digital image taking signal by means of a memory control circuit 107. It can also read out from a predetermined location (i.e., address). 105 is a digital signal processing portion with a built-in A/D converter, generating a final output image signal.

Note that the digital image taking signal stored in the memory remains to have a greater number of pixels than the standard image size. The memory control circuit 107 is able to obey control commands from the micon (i.e., microcomputer) 130 to select the lead pixels which is read out from the memory 106, and is configured so as to read out only an amount equal to the standard image size.

Reference numeral 130 is a camera control micon, and it performs control of the camera system as a whole. However, in order to simplify the diagrams, only the portion relevant to the blur correction has been shown here. Further, the detection of the vibration is made along two axes of pitch (i.e., a vertical axis) and yaw (i.e., horizontal axis). However, since exactly the same control is being performed in two axes, only one direction has been shown here.

Reference numeral 121 is an angular velocity sensor, and it detects vibration of the camera. 123 is an amp, and it amplifies the detected angular velocity signal.

Reference numeral 125 is an A/D converter built into the micon 130, whereby a two-directional angular velocity signal is converted into a digital signal and becomes angular velocity data. 126 is an HPF (i.e., high pass filter) for performing a DC cut, and 127 is a filter for performing phase compensation. 129 is an HPF for panning control and other such controls, in which the cut off frequency is variable. When panning is performed, the value of output from an integrator is stuck in one direction, and it does not quite return to normal state upon finishing panning, whereby the hand vibration correction ceases to be effective. Therefore, a correction control unit 131 judges the status of the panning based on the size of the output from the integrator 128, and while panning the cut off frequency of the HPF 129 is shifted to a higher frequency region in response to the size of the output from the integrator 128, and whereby producing a result that low-frequency elements produced while panning are cut and a control is applied so that the integral output does not get stuck. As a result, it becomes possible to perform good blur correction during the pan process and after panning, as well.

Predetermined signal processing is performed on the angular velocity data by means of the HPF 126, the phase compensator 127 and also the HPF 129 having the variable cut off frequency, and the integrator 128 generates a vertical and horizontal vibration correction signal.

A correction system control unit 141 transmits the vertical vibration correction signal to the CCD driving circuit 104 and the horizontal vibration correction signal to the memory control circuit 107, each from the output from the integrator 128. As described above, the CCD driving circuit 104 and the memory control circuit 107 each adjust the cut out position in response to the vibration correction signal.

As a result of this series of operations, a standard image size such as 502 or 504 is adjusted away from the center and cut out from the entire image size 501 as shown in FIG. 11, and as a result it becomes possible to correct an image blur resulting from hand vibration and the like.

However, in the case when an electronic blur correction apparatus is used, the blur correction can only be performed per field, so the vibration which occurs during the CCD storage remains in the picture as image deflection. If the shutter speed is made to be faster then this Is almost unnoticeable, and in conventional electronic blur correction apparatuses, a method is generally used in which the shutter speed during correction is constantly kept above a certain reference speed. However, due to the recent trend toward increasingly compact and light construction, the amplitude of the hand vibrations is greater, and the vibration frequency can easily become higher, so the image deflection of the picture can no longer be ignored. FIG. 13 is a diagram depicting residual vibration between fields in a case when there is hand vibration having a frequency of 7.5 Hz, which clearly shows that even if the shutter speed is made to be fast, the larger the hand vibrations are the greater the amount of the residual vibration is. In this way, when the amplitude of the vibrations is large the amount of image deflection in the picture becomes large, and even though the correction is working in the picture itself, a phenomenon is generated such that pictures with image deflection and pictures with no such image deflection are produced alternately, and the picture appears as if the focus were unstable or were constantly shifted, and further, since the focus appears as if it were unstable or were constantly shifted it also appears as though the blur correction unit were creating vibrations. Note, however, the frequency at this time is a maximum of 30 Hz (since the minimum cycle is one frame), regardless of the frequency of the hand vibrations of the operator. Therefore, the more precise the hand vibration correction is, the more conspicuous the phenomenon described above becomes, so there was a problem that the quality of the hand vibration correction function and the auto-focus function appeared to have declined.

SUMMARY OF THE INVENTION

An objective of the present invention is to provide a blur correction apparatus, a control device to be used in a blur correction apparatus, an apparatus such as an image taking apparatus, a control method to be used in these apparatuses, and a computer program product to be used with these apparatuses, in which the standard quality of the hand vibration correction is maintained, while at the same time, in the case when a large hand vibration occurs such that the resulting image deflection would be clearly noticeable, a vibration suppressing effect is deliberately reduced so as to preserve a small amount of the hand vibration, producing the result that the hand vibration appears more natural and a good picture image can be obtained in which a sense of the focus being softened is not conspicuous.

One aspect of the present invention for achieving the above objective is an apparatus, a control method and a computer program product adapted to a blur correction device to correct an image blur based on output of a vibration detection device, wherein the operation of the blur correction device is limited based on output from the vibration detection device, by a first limitation in a case where an amplitude of a vibration velocity is equal to or greater than a predetermined amplitude, and is limited by second limitation which limits a vibration with a different frequency than that of the first limit in a case where an amplitude of a vibration displacement is equal to or greater than a predetermined amplitude.

Further, another aspect of the present invention is an apparatus, a control method and a computer program product adapted to a blur correction device for correcting an image blur based on output of a vibration detection device, wherein operation of the blur correction device is limited in accordance with the size of the vibration detected by the vibration detection device and an image sensing time.

Further, another aspect of the present invention is an apparatus, a control method and a computer program product adapted to a blur correction device to correct an image blur based on output of a vibration detection device, wherein operation of the blur correction device is limited in accordance with size and frequency of the vibration detected by the vibration detection device.

Other aspects of the present invention should become apparent from the preferable, specific embodiments shown below.

DETAILED DESCRIPTION OF THE PREFERRED EMBODIMENTS

Hereinafter, detailed explanation will be made of preferable embodiments of the present invention, making reference to the diagrams.

Figure 1:
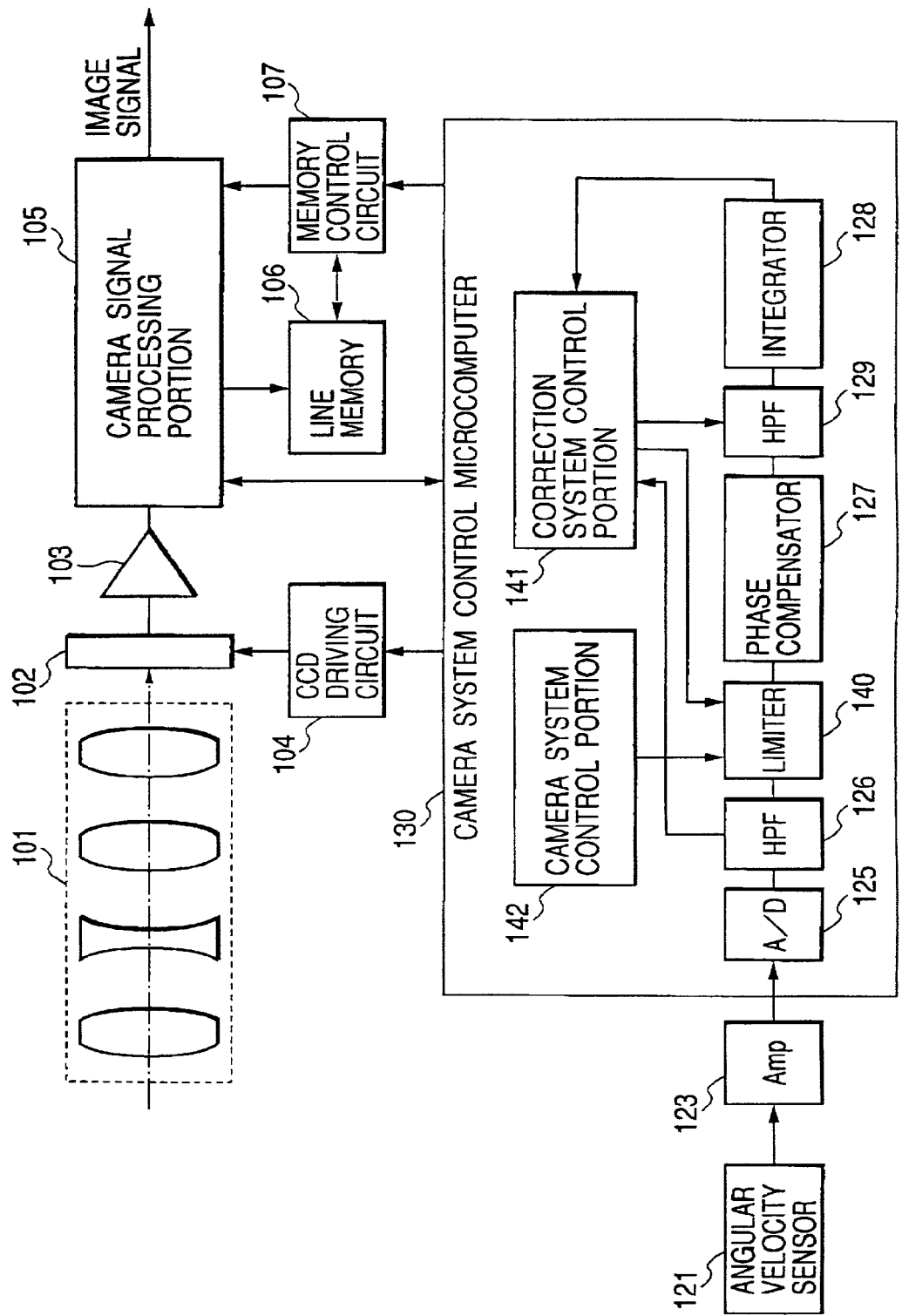
FIG. 1 is a block diagram depicting a construction of an image taking apparatus according to an embodiment of the present invention.
Figure 12:
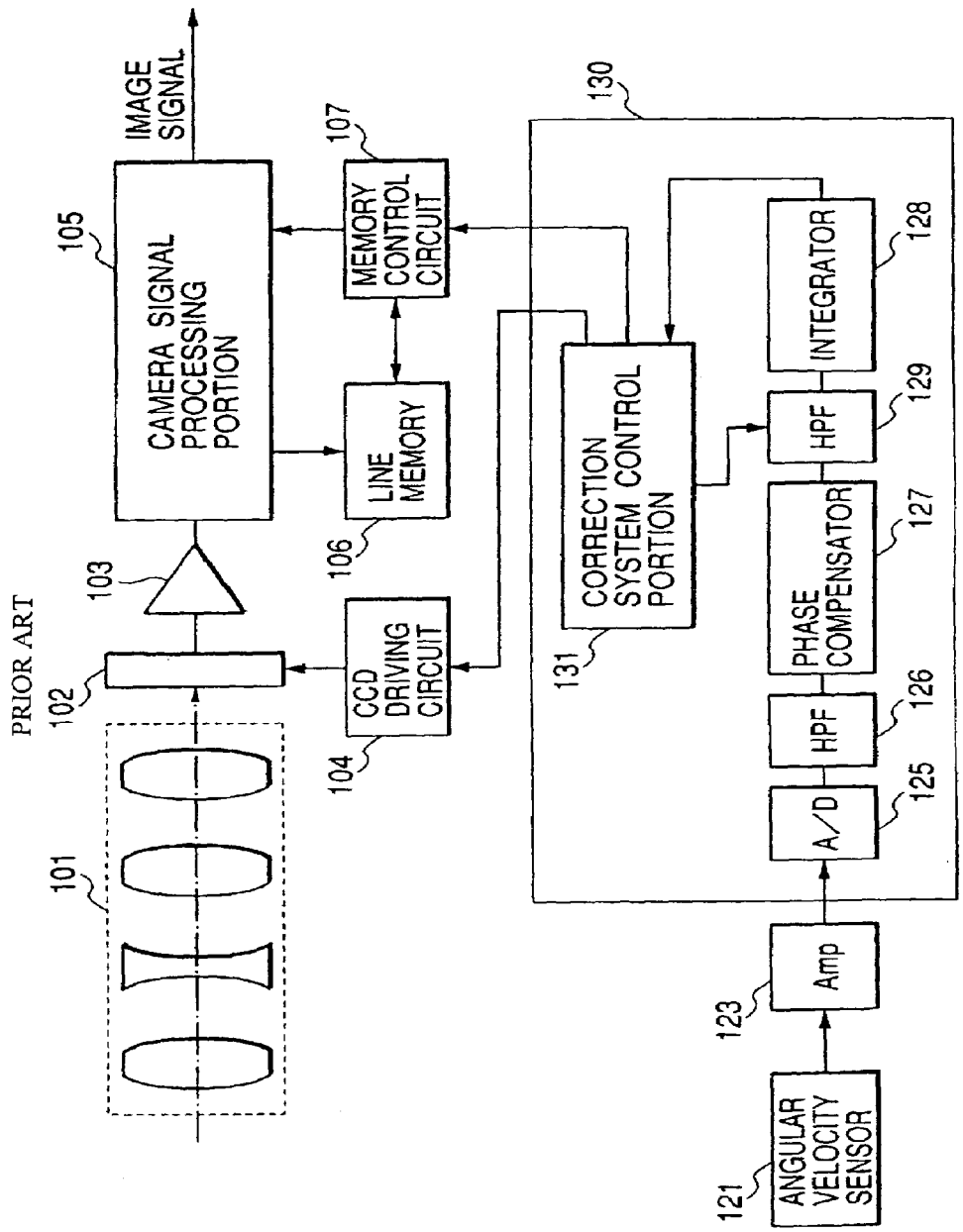
FIG. 12 is a block diagram of a construction of an image taking apparatus, according to a conventional example.

FIG. 1 is a block diagram depicting a construction of an image taking apparatus according to an embodiment of the present invention. In FIG. 1, parts which perform the same functions as in FIG. 12 are labeled with the same reference numerals as in FIG. 12, and explanations thereof have been abbreviated.

In FIG. 1, reference numeral 140 is a block inside a micon (i.e., microcomputer), and it is a limiter circuit capable of applying limitations on the data outputted from the angular velocity sensor during filtering calculations. In other words, the apparatus of the present embodiment is equipped with two limiting means, in which one (i.e., the HPF 129) is a means for limiting only the low frequency components according to the amplitude of the vibration displacement (i.e., the output from the integrator 128), and the other (i.e., the limiter circuit 140) is a means for limiting the angular velocity signal itself based on the amplitude of the angular velocity signal. Further, 142 is a camera system control unit which includes a shutter speed control unit and the like, and 141 is a correction system control unit including a parameter calculation unit for determining characteristics of the limiter circuit mentioned above.

According to the above construction it becomes possible to perform the conventional blur correction control, including the pan control, while at the same time modifying the characteristics of the limiter circuit with respect to the output signal from the angular velocity sensor based on the amplitude of its angular velocity, its shutter speed and/or information about the frequency of its vibrations.

(First Embodiment)

Figure 2:
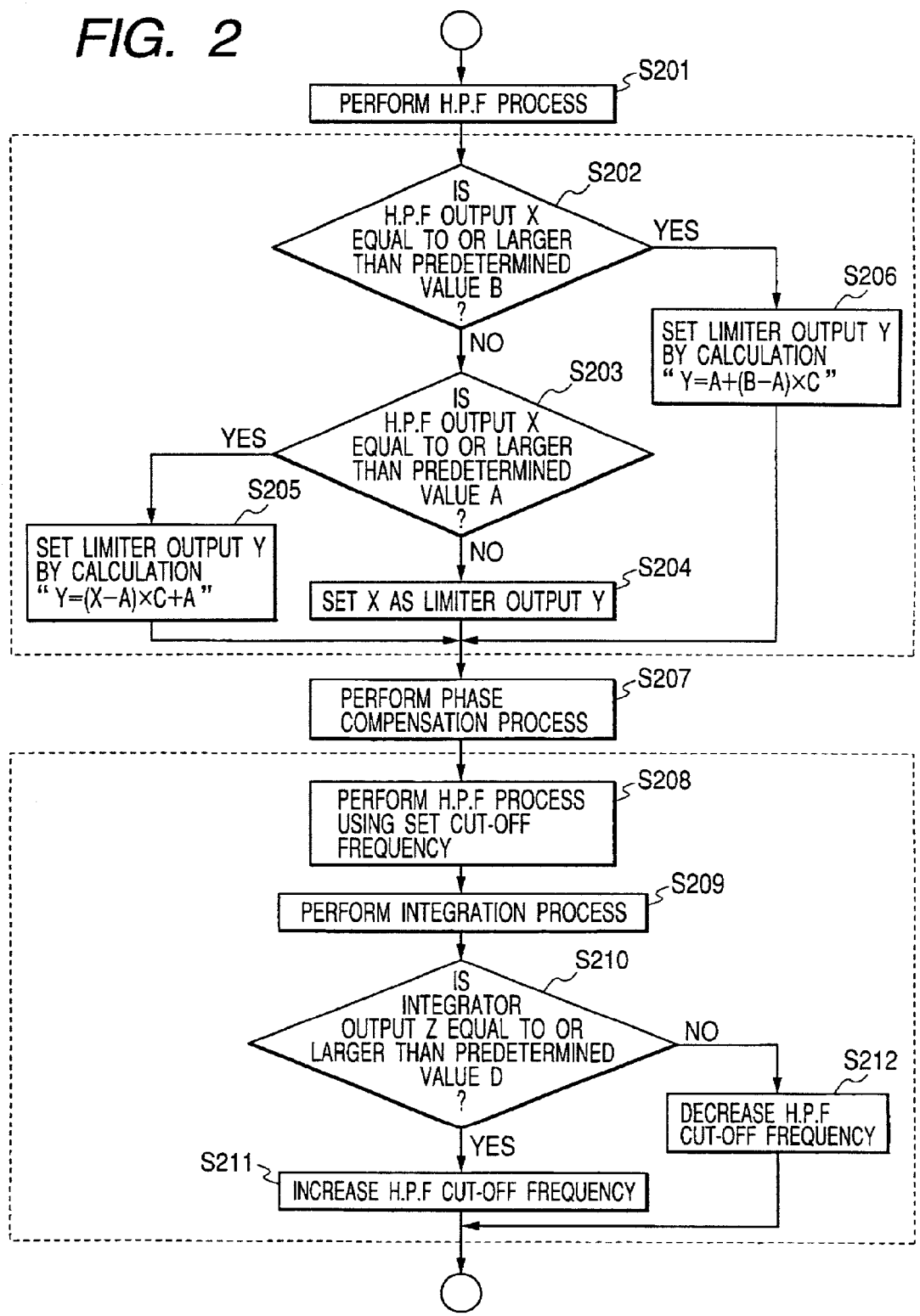
FIG. 2 is a flow chart according to a first embodiment of a camera control micon 130 shown in FIG. 1.

Explanation will now be made of a first embodiment of the present invention, which is a case in which the characteristics of the limiter circuit are modified based on the size of the amplitude of the angular velocity signal. A flow chart of the camera control micon 130 relevant to the present embodiment is depicted in FIG. 2. Hereinafter, detailed explanation will be made of the present embodiment based on the flow chart of FIG. 2.

In FIG. 2, reference numeral S201 indicates a process at the HPF 126. The output from the HPF 126 is first judged at S202 as to whether it is equal to or larger than a predetermined value B. If the output from the HPF 126 is smaller than the predetermined value B, then a determination is made at S203 as to whether the output of the HPF 126 is equal to or larger than a predetermined value A. If the output is smaller than the predetermined value A then at S204 the output is set as a limiter output and is treated as being the HPF output, and the process advances to the phase compensation process S207. The preceding process flow is for the case when the amplitude of the hand vibration is small. Now then, in the case when the output is determined at S203 to be equal to or larger than the predetermined value A, the limiter output Y is set at S205 by using the calculation of $Y=(X-A)\times C+A$ and then the process advances to the phase compensation process at S207. Here, X is the output from the HPF 126, and A and B are the predetermined values mentioned above, being a threshold set in advance. C is an output inclination in the case when an HPF 126 output being equal to or larger than the predetermined value A was inputted, and this inclination being:

$C<1$.

Figure 3:
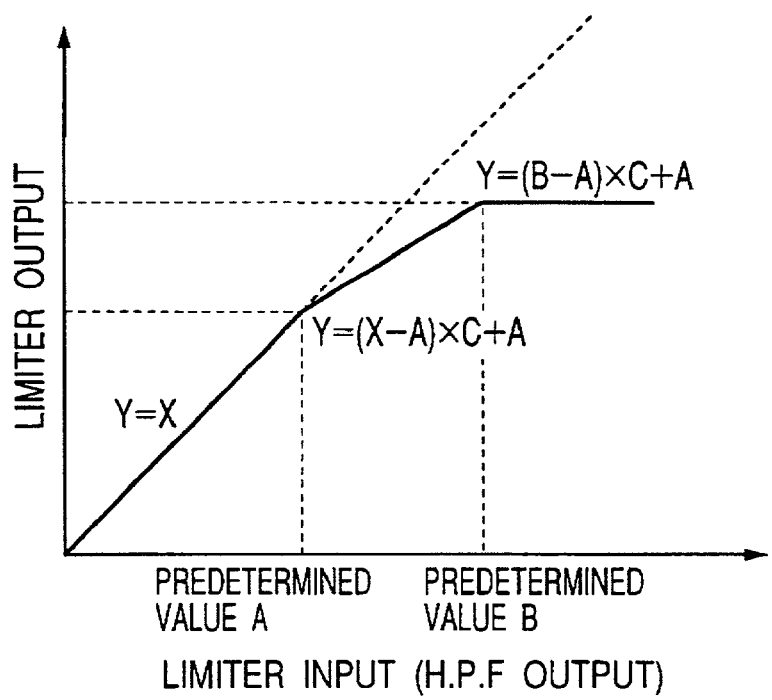
FIG. 3 is a diagram depicting input/output characteristics according to a first embodiment of a limiter circuit 126 shown in FIG. 1.

If the HPF output is equal to or larger than the predetermined value B at S202, then the limiter output is set at S206 by using the calculation of $Y=A+(B-A)\times C$ (constant value)

and the process advances to the phase compensation process at S207. FIG. 3 is a diagram depicting input and output of the limiter circuit 140. Here, a signal which has passed through the limiter circuit 140 takes on a form as depicted in FIG. 3. After the phase compensation process has been performed the HPF calculations are performed at S208, but explanation of this process is to be explained later. Then at S209 the integration process is performed. This is a section which corresponds to the integrator 128 in FIG. 1, and the actual amount of the displacement caused by the vibration is calculated by performing the integration process on the angular velocity signal. The blur correction amount that is calculated as a result of this process may be a value such as that shown in FIG. 4. As is clear in FIG. 4, by adding the limiter circuit 140 and providing the limiter to the gyro signal a normal correction amount is calculated in the case when the amplitude is small, and in the case when the amplitude is large a correction amount smaller than the actual correction amount required for correcting the vibration is calculated.

The above description is concerned with a process for limiting the angular velocity signal itself according to the size of the angular velocity signal, and by performing this limitation the effect of the hand vibration correction is weakened only in the case when a large hand vibration occurred such as would create a conspicuous image trace in the picture image, and thus it is possible to create a recorded motion picture in which an image trace does not stand out.

Now then, after the integration process is performed at S209, a determination is made at S210 as to whether the integral output is equal to or larger than a predetermined value D or not. The predetermined value D mentioned here is set at a value which is significantly larger than the range in which the output of the integrator shown in FIG. 4 may be taken. By this determination, a judgement is made as to whether panning is being performed or not. In the case when panning is being performed the integral output grows larger in one direction, so it is possible to make the above determination by looking at the output of the integrator 128. In the case when the integral output is larger than the predetermined value D, the cut off frequency of the HPF 129, which has the variable cut off frequency, is raised at S211. As a result of this operation, the next time that the vibration prevention processing is performed, the control is based on the new cut off frequency, and the angular velocity signal which is the closest to the level of DC is cut off. As a result, it becomes possible to prevent the output from the integrator 128 from becoming stuck in the state where the vibration prevention effect against the frequency of the hand vibration remains unchanged. Note that in this embodiment the cut off frequency at times other than during panning is 0.1 Hz, and during panning it is variable within the range of 0.1 Hz–2.6 Hz, according to the vibration amplitude level (i.e., the integrator output level).

In the case when the integral output is smaller than the predetermined value D at S210, the pan is determined to have finished, and the HPF 129 cut off frequency is decreased at S212, and a process to return to the normal state is performed.

Figure 4:
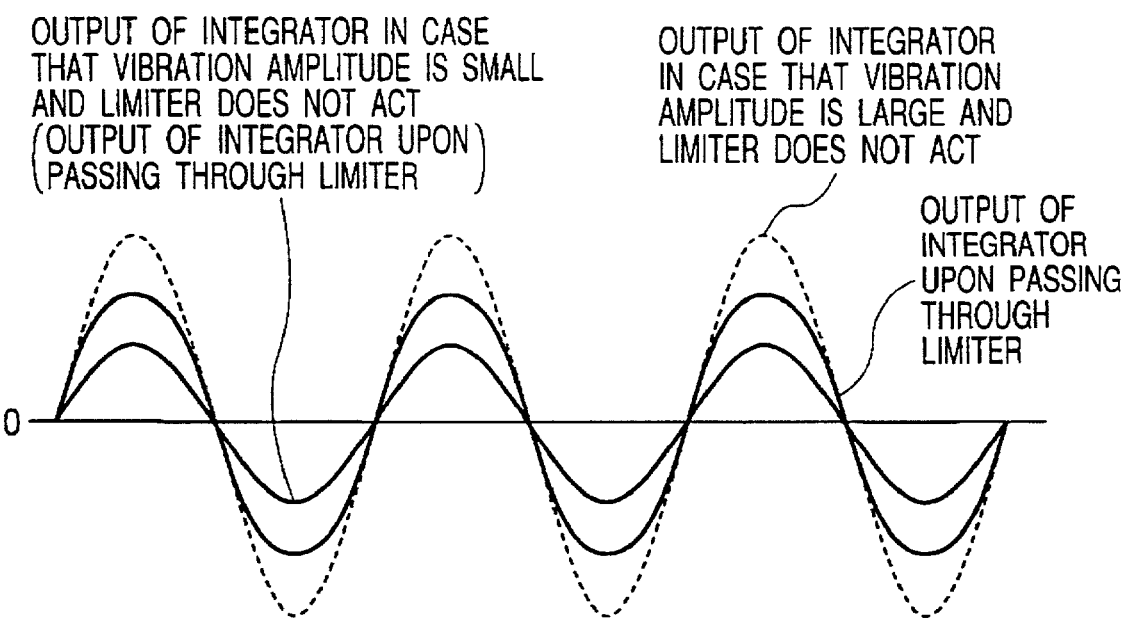
FIG. 4 is a diagram depicting a correction output according to the first embodiment.

The process described above is a process for limiting the correction amount according to the amplitude of the vibration displacement, or in other words, it is a process taken in the case of the panning. In the case when the detected vibration is produced not by the panning but by merely the hand vibration, then the amplitude of the vibration displacement, which is the output of the integrator 128, always cuts back and forth across a point 0 as shown in FIG. 4, and the predetermined value D used in the determination of panning status described above is set at a value which is significantly larger than the amplitude of the vibration displacement at the time of the hand vibration so there is no limit placed by the amplitude of the vibration displacement.

As explained above, by performing control of the blur correction by means of two control means having mutually different limit characteristics, it is possible to perform pan control corresponding to the amplitude of the vibration in the case when panning is being performed, and in the case when panning is not being performed and a normal hand vibration has been detected, then a given limit is applied to the size of the angular velocity signal which has been detected, producing the result that in the case when the hand vibration is small it is possible to produce an image free from the effect of hand vibration, and only in the case when a large hand vibration has occurred such as would leave a conspicuous image deflection the vibration prevention effect is then decreased; therefore, that it is possible for the recorded moving image to be always free of a conspicuous afterimage.

Figure 5:
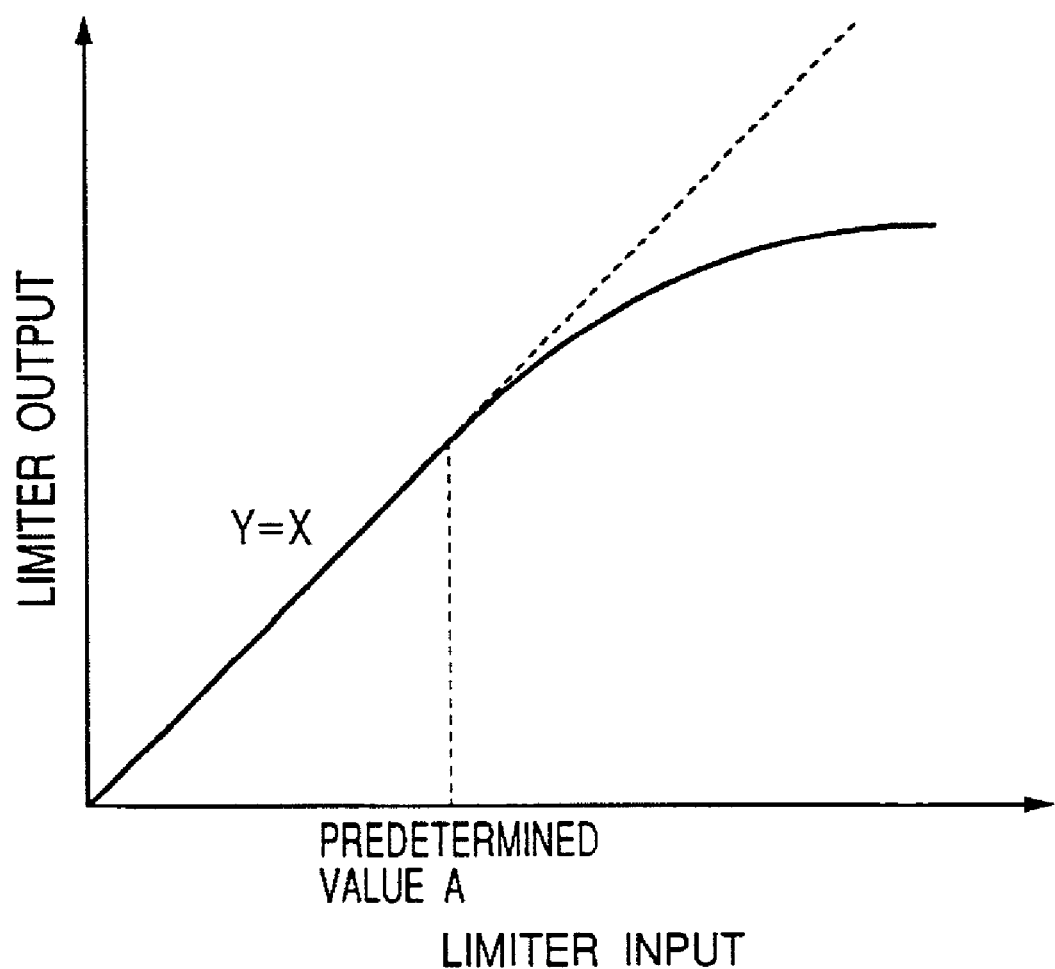
FIG. 5 is a diagram depicting other input/output characteristics according to the first embodiment of the limiter circuit 126 shown in FIG. 1.

In the present embodiment, the characteristics of the limiter based on the size of the angular velocity signal are configured with a simple construction, as depicted in FIG. 3, and data equal to or larger than the predetermined value B is treated as a constant. However, it is also possible to use a straight line with smaller inclination. Further, a similar effect can be achieved if, for example, characteristics can be achieved such that the output drops when the input is equal to or larger than a given value, as shown in FIG. 5.

(Second Embodiment)

Figure 13:
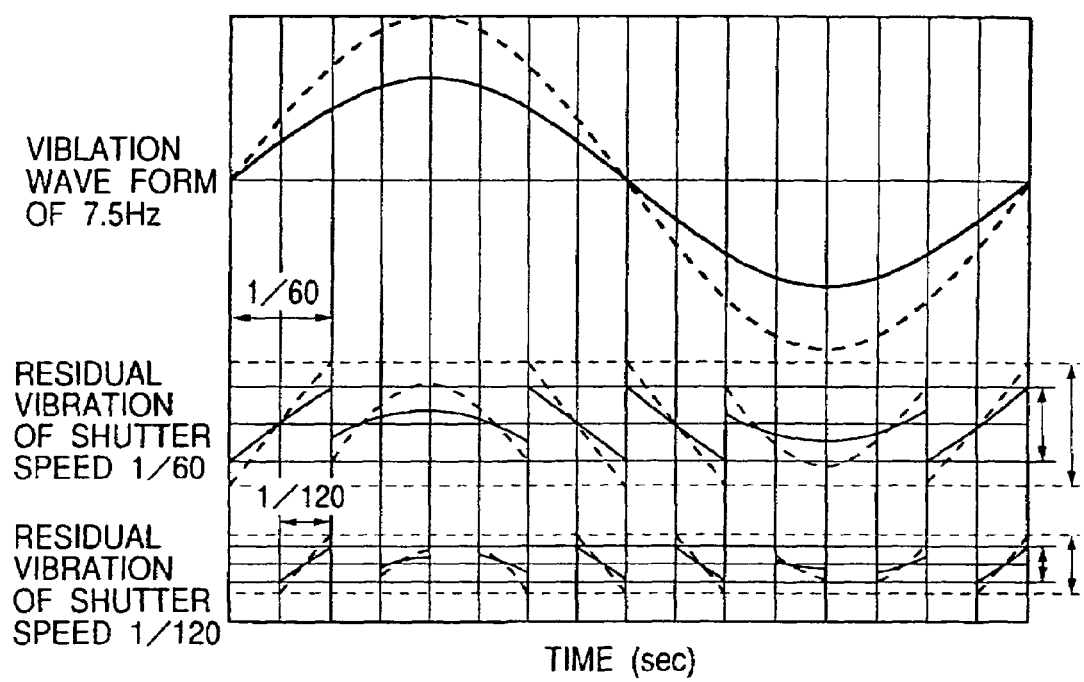
FIG. 13 is a diagram depicting residual vibration during a CCD storage period in a case when there is a vibration of a frequency of 7.5 Hz.
Figure 9:
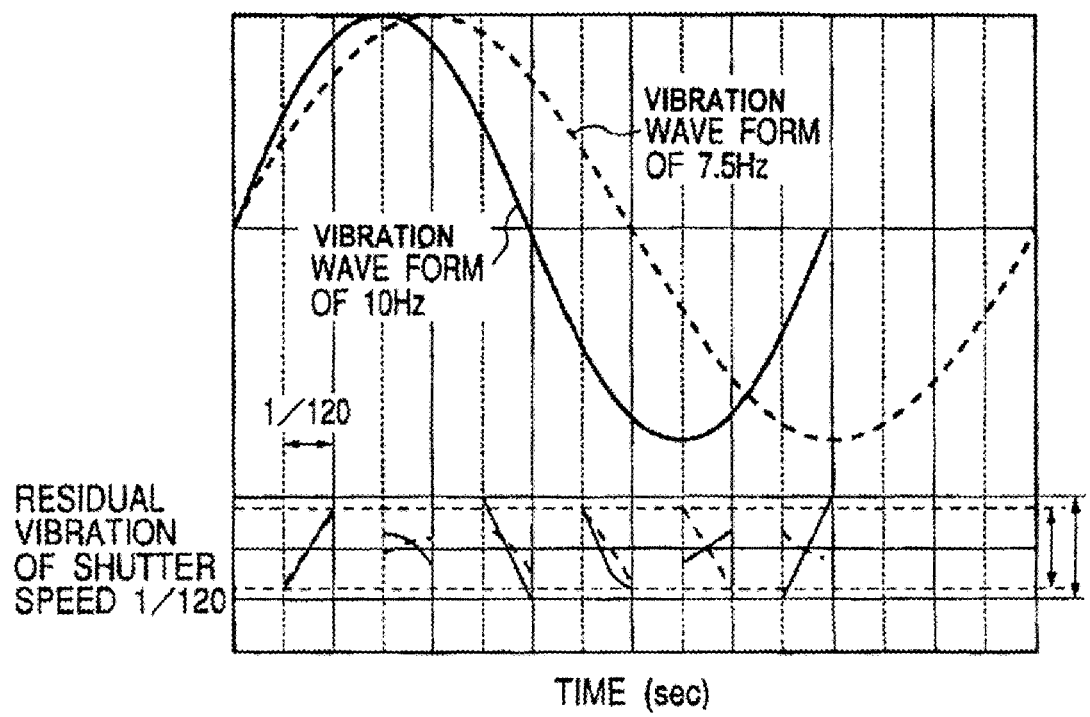
Figure 13:
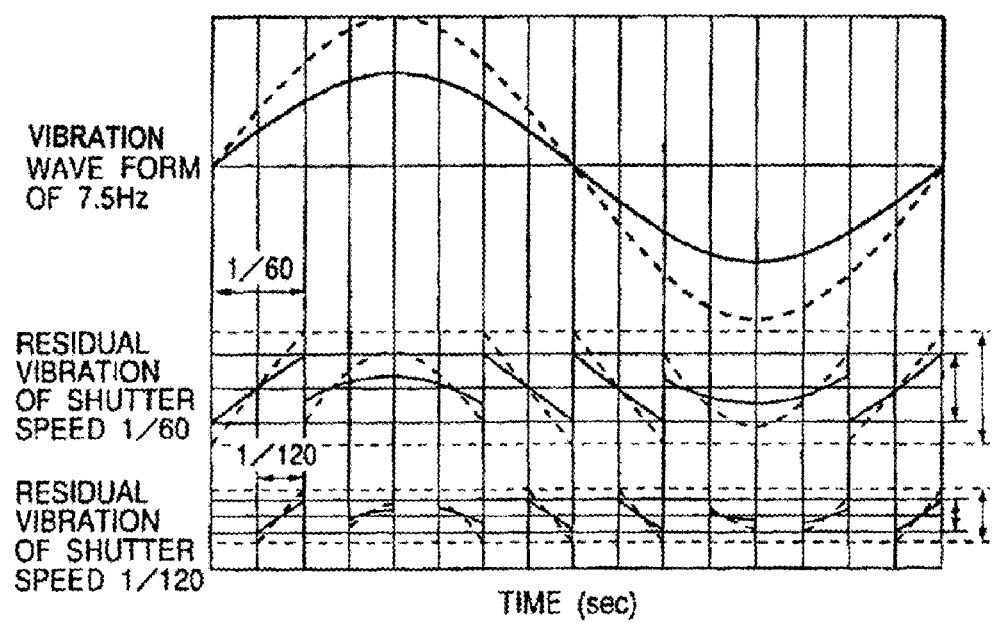

Explanation will now be made of a second embodiment, which is a case in which the characteristics of the limiter circuit 140 are modified based on the amplitude of the angular velocity signal and the shutter speed. As explained above, in the case when electronic hand vibration correction is performed the shutter speed is generally set to be fast. However, there are cases when, depending on CCD sensitivity and lens brightness, a situation occurs in which selection of a 1/60 shutter speed cannot be avoided. When the shutter speed is slow the image deflection of the picture grows great, as shown in FIG. 13, so a sense of afterimage grows greater, too. On the other hand, in the case when an image is to be taken in an extremely light place the shutter speed is set faster, so the sense of the afterimage does not stand out no matter how great the hand vibration may be. Therefore, in the present embodiment the characteristics of the limiter circuit 140 are modified in accordance with the amplitude of the angular velocity signal and the shutter speed, so that the sense of afterimage is made to be not conspicuous.

Figure 6:
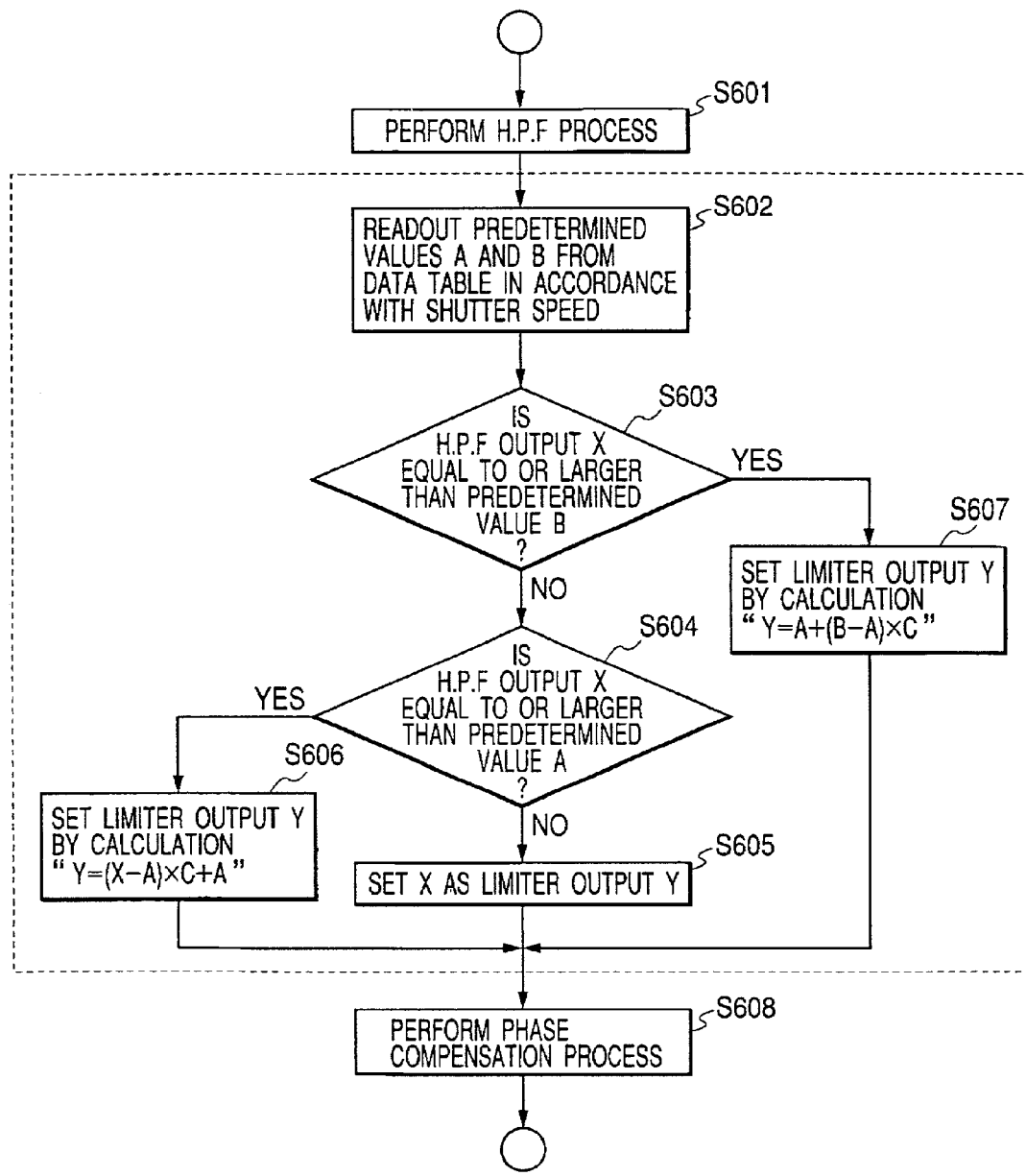
FIG. 6 is a flow chart according to a second embodiment of the camera control micon 130 shown in FIG. 1.

FIG. 6 is a flow chart of the camera control micon 130 represented by the present embodiment. Hereinafter, detailed explanation will be made of the present embodiment in accordance with the flow chart of FIG. 6.

Figures 7, 8:
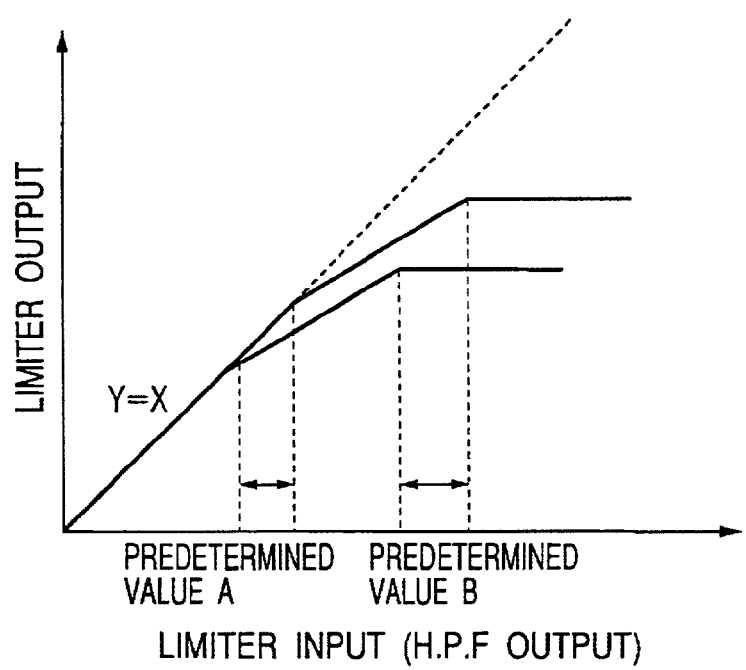
FIG. 7 is a diagram depicting one example of a data table used in the second embodiment of the present invention.
FIG. 8 depicts other input output characteristics according to the second embodiment of the limiter circuit 126 shown in FIG. 1.

In FIG. 6, reference numeral S601 indicates calculations by the HPF 126. At S602 the predetermined value A and the predetermined value B set in accordance with the shutter speed are read. The shutter speed is set by the camera system control portion 142 inside the camera system control micon 130. However, depending on the setting state, the shutter speed may be read from a data table such as the one shown in FIG. 7, for example. This table indicates the ratio of the output of limiter circuit for each shutter speed, in the case when the HPF output is set at 100% of the maximum value. After S603 the procedure continues in the same way as in the first embodiment, such that in the case when the HPF output is equal to or larger than the predetermined value B at S603 then the limiter circuit output is set at S607. If the HPF output is equal to or larger than a predetermined value A at a comparison on S604 then the limiter circuit output is set at S606, and if not then it is set at S605. Then the processed output is transmitted to phase compensation portion acting at S608. As a result of this process, the output of the limiter circuit based on the shutter speed becomes as in FIG. 8, such that the vibration prevention effect changes depending on the shutter speed and the amplitude of the angular velocity signal, and the vibration prevention effect becomes weaker in the case when the shutter speed is slower and therefore the sense of afterimage tends to be greater, whereby it is possible for the sense of afterimage to become less conspicuous and a more natural moving picture may be obtained.

The present embodiment adopts a method in which a threshold for changing the characteristics of the limiter circuit is read out from the data table. However, it is also possible to calculate the threshold based on a function using the shutter speed as a parameter. Further, in the calculation of the limiter output, it is also effective to change the inclination of the output in accordance with the shutter speed.

(Third Embodiment)

Figure 9:
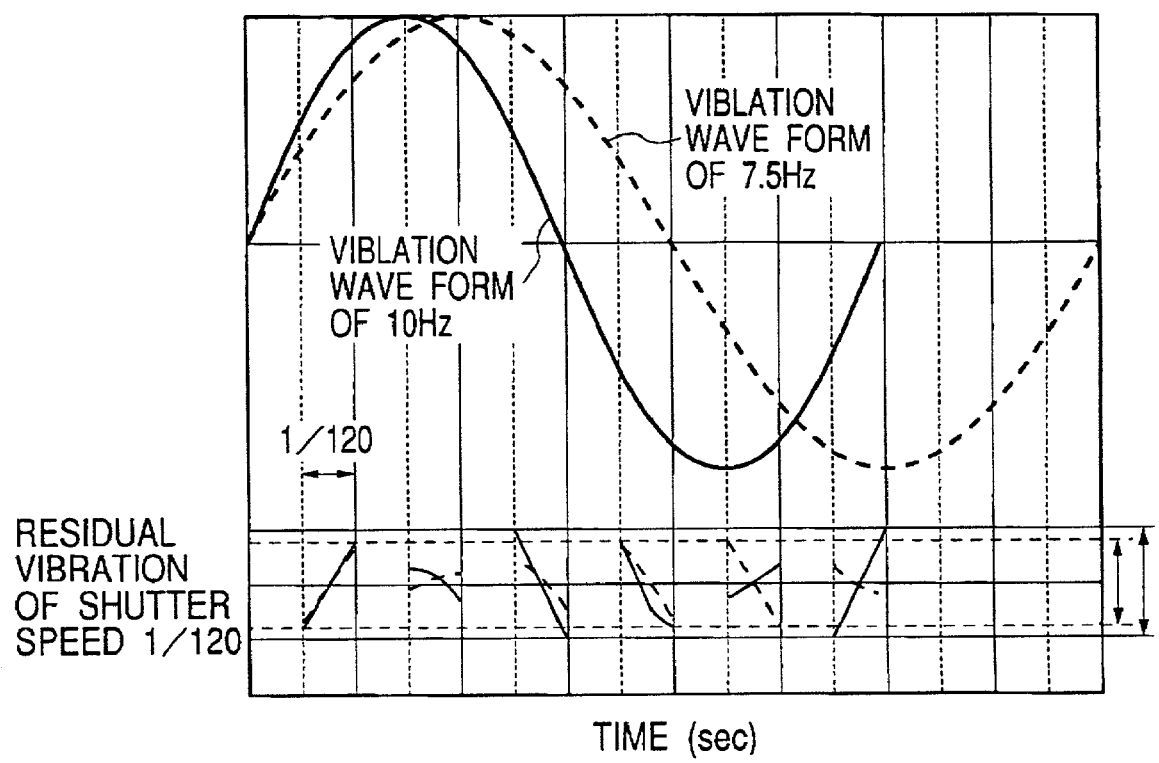
FIG. 9 is a diagram depicting residual vibration during a CCD storage period in a case of differing frequencies, according to a third embodiment of the present invention.
Figure 10:
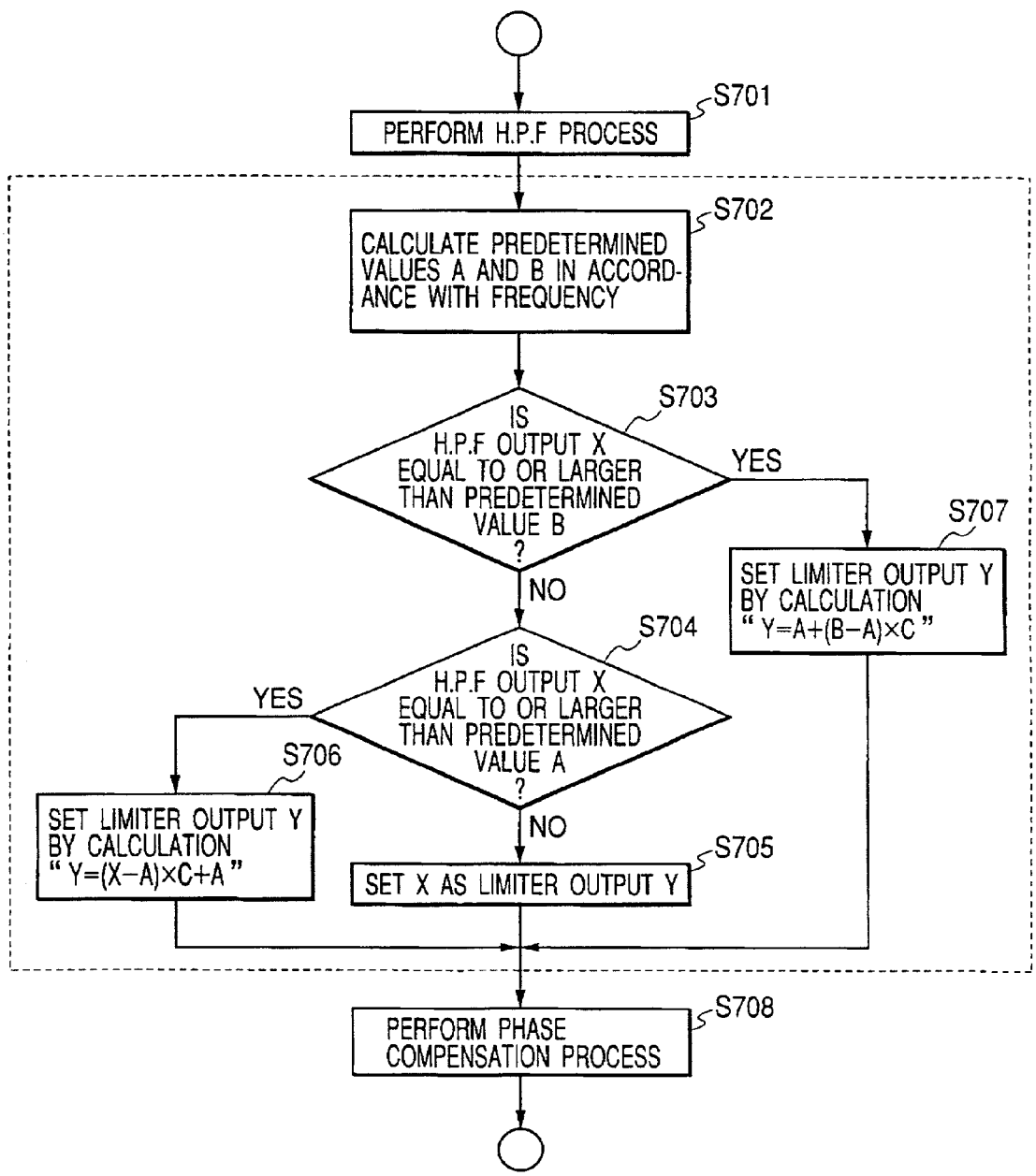
FIG. 10 is a flow chart according to a third embodiment of the camera control micon 130 shown in FIG. 1.
Figure 11:
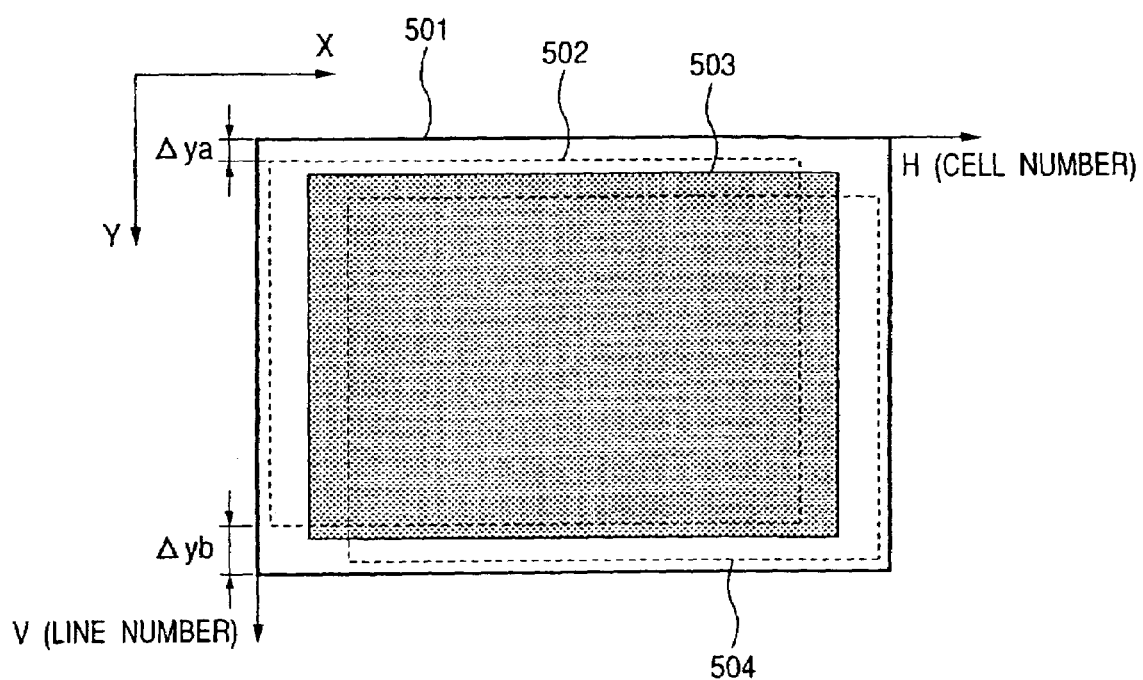
FIG. 11 is a diagram depicting an electronic vibration suppression performed by a cutting out operation.

A third embodiment of the present invention is an example of a case which also focuses on and makes use of frequency components of the vibration. FIG. 9 is a diagram depicting residual vibration during the CCD storage in the case when the frequency is 7.5 Hz and in the case when it is 10 Hz. It is clear from the diagram that even if the amplitude is the same, when the frequency increases the image deflection of the picture increases. Therefore, in the present embodiment the characteristics of the limiter circuit 140 are altered in accordance with the amplitude of the angular velocity signal and the frequency of the vibrations. FIG. 10 depicts a flow chart of the camera control micon 130 according to the present embodiment. Hereinafter, detailed explanation will be made of the present embodiment according to the flow chart of FIG. 10.

In FIG. 10, reference numeral S701 indicates the calculations performed at the HPF 126. At S702 the calculations of the predetermined values A and B are performed in accordance with the frequency calculated at the correction system control unit 141. The calculation here may include a function using the frequency as a parameter and being configured such that the greater the frequency is the larger the value becomes, or alternatively it may be comprised of referencing the data table based on the frequency. Then, data processing similar to that described above is performed from S703–S707 based on the predetermined values A and B which have been calculated. Then at S708, processing at the phase compensation circuit 127 is performed on the output thereof. In the integrator output which is ultimately to be produced by the above-described process, the greater the vibration frequency becomes, or the greater the amplitude of the angular velocity signal is, then the greater the attenuation rate of the output becomes, and as a result, in the case when the sense of the residual image would be great the vibration prevention effect is suppressed, so the sense of the residual image may be made less likely to stand out and a more natural moving picture may be obtained.

Explanation was made here of a method in which the characteristics of the limiter circuit are changed in accordance with the amplitude of the angular velocity signal and the frequency of the vibration. However, it goes without saying that it is also possible to include consideration of the shutter speed as a parameter for the calculation of the threshold (i.e., the predetermined value) of the limiter circuit, and thereby achieve more natural vibration prevention control.

According to the embodiments described above, by changing the characteristics of the limiter circuit in accordance with the amplitude of the angular velocity signal, the shutter speed and the vibration frequency, it becomes possible to achieve excellent hand vibration correction function in the case when the hand vibration is small, and also to deliberately reduce the vibration prevention effect in the case when the hand vibration is great, and thereby obtain a high quality motion picture which is free of a sense of afterimage.

For example, in the above embodiments an angular velocity sensor is used as a vibration detection means. However, an angular acceleration sensor or any other type of vibration detection means may be used in the present invention.

Further, the hardware construction and the software construction of the embodiments described above may be switched as necessary.

Also note that in the present invention, it is possible to combine the embodiments described above or technical elements thereof as necessary.

Further, the scope of the claims of the present invention or the construction of the embodiments thereof either as a whole or in part may form a single apparatus, or may be joined with another apparatus or may be elements which comprise an apparatus.

Further, the present invention may be applied to a variety of types of cameras capable of taking either moving images or still images, including electronic cameras such as video cameras or those which use film such as silver salt cameras, single lens reflex cameras, lens shutter cameras, monitoring cameras or the like. The present invention may also be used in image taking apparatuses other than a camera, optical apparatuses or other related apparatuses, or to an apparatus which is applied to these cameras, image taking apparatuses, optical apparatuses or other related apparatuses, or may be used in an element which comprises one of these apparatuses, control methods to be used in these apparatuses or computer program product storage media or the like for providing control programs therefor.

What is claimed is:

1. An apparatus comprising:
 (A) a vibration detection device that includes an angular velocity sensor for detecting an angular velocity in vibration of said apparatus;
 (B) a blur correction device that corrects an image blur, based on output of said vibration detection device; and
 (C) a limiting device that in a case where an output of said vibration detection device is equal to or larger than a first predetermined amplitude value and is smaller than a second predetermined amplitude value, limits the output using a first limitation manner in which a first predetermined attenuation ratio is multiplied onto the output, so as to make the output continuously leading to an output of the first predetermined amplitude value, and in a case where the output is equal to or larger than the second predetermined amplitude value, selects one of (a) limiting the output using a second limitation manner in which a second predetermined attenuation ratio which provides an attenuation action larger than that provided by the first predetermined attenuation ratio is multiplied onto the output and (b) setting the output into a constant amplitude value, so as to make the output continuously leading to an output of the second predetermined amplitude value.

2. An apparatus according to claim 1, further comprising an image sensing device that senses the optical subject image and converts the optical subject image into an image signal, wherein
 based on the output from said vibration detection device, said blur correction device corrects blurring of the subject image appearing between the image signals sensed by the image sensing device at different times, by processing these image signals.

3. An apparatus according to claim 1, wherein said apparatus includes an image sensing apparatus.

4. An apparatus adapted to a blur correction device to correct an image blur based on an output of a vibration detection device, wherein said vibration detection device includes an angular velocity sensor for detecting an angular velocity in vibration of said apparatus, the apparatus comprising:
 a limiting device that in a case where an output of said vibration detection device is equal to or larger than a first predetermined amplitude value and is smaller than a second predetermined amplitude value, limits the output using a first limitation manner in which a first predetermined attenuation ratio is multiplied onto the output, so as to make the output continuously leading to an output of the first predetermined amplitude value, and in a case where the output is equal to or larger than the second predetermined amplitude value, selects one of (a) limiting the output by a second limitation manner in which a second predetermined attenuation ratio which provides an attenuation action larger than that provided by the first predetermined attenuation ratio is multiplied onto the output and (b) setting the output into a constant amplitude value, so as to make the output continuously leading to an output of the second predetermined amplitude value.

5. An apparatus according to claim 4, further comprising an image sensing device that senses an optical subject image and converts the optical subject image into an image signal, wherein based on the output of said vibration detection device, said blur correction device corrects blurring of the subject image appearing between the image signals sensed by the image sensing device at different times, by processing these image signals.

6. An apparatus according to claim 4, wherein said apparatus includes an image sensing apparatus.

7. A control method adapted to a blur correction device to correct an image blur based on an output of a vibration detection device, wherein the vibration detection device includes an angular velocity sensor for detecting an angular velocity in vibration of an apparatus, the method comprising:

in a case where an output of the vibration detection device is equal to or larger than a first predetermined amplitude value and is smaller than a second predetermined amplitude value, limiting the output using a first limitation manner in which a first predetermined attenuation ratio is multiplied onto the output, so as to make the output continuously leading to an output of the first predetermined amplitude value, and in a case where the output is equal to or larger than the second predetermined amplitude value, selecting one of (a) limiting the output using a second limitation manner in which a second predetermined attenuation ratio which provides an attenuation action larger than that provided by the first predetermined attenuation ratio is multiplied onto the output and (b) setting the output into a constant amplitude value, so as to make the output continuously leading to an output of the second predetermined amplitude value.

8. A computer program product adapted to a blur correction device to correct an image blur based on an output of a vibration detection device, wherein the vibration detection device includes an angular velocity sensor for detecting an angular velocity in vibration of an apparatus, the computer program product being stored in a computer-readable medium and effecting a method comprising:

in a case where an output of the vibration detection device is equal to or larger than a first predetermined amplitude value and is smaller than a second predetermined amplitude value, limiting the output using a first limitation manner in which a first predetermined attenuation ratio is multiplied onto the output, so as to make the output continuously leading to an output of the first predetermined amplitude value, and in a case where the output is equal to or larger than the second predetermined amplitude value, selecting one of (a) limiting the output by a second limitation manner in which a second predetermined attenuation ratio which provides an attenuation action larger than that provided by the first predetermined attenuation ratio is multiplied onto the output and (b) setting the output into a constant amplitude value, so as to make the output continuously leading to an output of the second predetermined amplitude value.

9. An apparatus according to claim 1, wherein the first predetermined value and the second predetermined value are set in accordance with an image sensing time for sensing an object image.

10. An apparatus according to claim 1, wherein the first predetermined value and the second predetermined value are set in accordance with an output relating to a frequency used in said vibration detection device.

11. An apparatus according to claim 4, wherein the first predetermined value and the second predetermined value are set in accordance with an image sensing time for sensing an object image.

12. An apparatus according to claim 4, wherein the first predetermined value and the second predetermined value are set in accordance with an output relating to a frequency used in said vibration detection device.

13. A method according to claim 7, wherein the first predetermined value and the second predetermined value are set in accordance with an image sensing time for sensing an object image.

14. A method according to claim 7, wherein the first predetermined value and the second predetermined value are set in accordance with an output relating to a frequency used in the vibration detection device.

15. A computer program product according to claim 8, wherein the first predetermined value and the second predetermined value are set in accordance with an image sensing time for sensing an object image.

16. A computer program product according to claim 8, wherein the first predetermined value and the second predetermined value are set in accordance with an output relating to a frequency used in the vibration detection device.

* * * * *

UNITED STATES PATENT AND TRADEMARK OFFICE
CERTIFICATE OF CORRECTION

PATENT NO. : 7,064,777 B2
APPLICATION NO. : 09/941591
DATED : June 20, 2006
INVENTOR(S) : Tatsuya Yamazaki It is certified that error appears in the above-identified patent and that said Letters Patent is hereby corrected as shown below:

ON THE TITLE PAGE
At Item (54), Title, "APARATUS," should read --APPARATUS,--.

IN THE DRAWINGS
Sheet 7, Fig. 9, "VIBLATION" should read --VIBRATION-- (both occurrences).
Sheet 11, Fig. 13, "VIBLATION" should read --VIBRATION--. As shown in the attached sheets COLUMN 1
Line 1, "APARATUS," should read --APPARATUS,--.
Line 53, "CDD" should read --CCD--.

COLUMN 2
Line 21, "then an" should read --then a--.
Line 43, "CDD" should read --CCD--.

COLUMN 3
Line 46, "Is" should read --is--.

Signed and Sealed this

Twenty-second Day of July, 2008

JON W. DUDAS
*Director of the United States Patent and Trademark Office*